United States Patent [19]
Inoue et al.

[11] Patent Number: 5,274,997
[45] Date of Patent: Jan. 4, 1994

[54] GAS TURBINE ENGINE

[75] Inventors: Kazuo Inoue; Noriyuki Kishi; Takashi Bannai; Tsuneo Endoh; Hisayoshi Aoki, all of Saitama, Japan

[73] Assignee: Honda Giken Kogyo Kabushiki Kaisha, Tokyo, Japan

[21] Appl. No.: 786,059

[22] Filed: Oct. 31, 1991

[51] Int. Cl.$^5$ .......................... F02C 7/10; F02G 1/00
[52] U.S. Cl. .............................. 60/39.511; 60/39.512; 74/DIG. 5; 165/8
[58] Field of Search .................. 60/39.511, 39.512; 74/DIG.; 165/8

[56] References Cited

U.S. PATENT DOCUMENTS

| | | | |
|---|---|---|---|
| 2,727,602 | 12/1955 | Saives | 74/DIG. 5 |
| 2,874,585 | 2/1959 | Lasley | 74/DIG. 5 |
| 2,925,714 | 2/1960 | Cook | 60/39.511 |
| 3,039,265 | 6/1962 | Williams et al. | 60/39.511 |
| 3,177,928 | 4/1965 | Tumavicus et al. | 165/7 |
| 3,487,482 | 1/1970 | Maljanian | 60/39.511 |
| 3,491,537 | 1/1970 | Stopa et al. | 60/39.51 |
| 3,985,181 | 10/1976 | Guillot | 165/8 |
| 4,009,576 | 3/1977 | Doerner et al. | 165/8 |
| 4,300,349 | 11/1981 | Heckel | 60/39.511 |
| 4,372,370 | 2/1983 | Stockman | 165/8 |
| 4,825,645 | 5/1989 | Bell, III | 74/DIG. 5 |
| 4,993,223 | 2/1991 | Kretzinger | 60/39.511 |

FOREIGN PATENT DOCUMENTS

| | | | |
|---|---|---|---|
| 0586159 | 11/1959 | Canada | 60/39.512 |
| 1221850 | 7/1966 | Fed. Rep. of Germany | |
| 2315610 | 1/1977 | France | |
| 710959 | 6/1954 | United Kingdom | |
| 0883530 | 11/1961 | United Kingdom | 60/39.512 |
| 905109 | 9/1962 | United Kingdom | |
| 1246516 | 9/1971 | United Kingdom | |

Primary Examiner—Richard A. Bertsch
Assistant Examiner—Howard R. Richman
Attorney, Agent, or Firm—Lyon & Lyon

[57] ABSTRACT

A reduction gear for producing and feeding the rotation of a low pressure turbine driven by a combustion gas generated in a combustor to an output shaft is received in a central opening of a rotary type heat exchanger which is disposed so as to be perpendicular to a turbine shaft at a rear portion of a body housing of a gas turbine engine. As a result, not only the engine can be made small but also the output can be produced at to the opposite side of the heat exchanger. The combustor and a collector housing for collecting combustion gas are disposed on diametrical opposite sides in a transverse cross section of the body housing whereby an internal space of the body housing is effectively utilized and an axial dimension of the engine is shortened. Since the compressed air is supplied to the heat exchanger through peripheral walls of the body housing having a double construction, prevention of heat radiation from the body housing and effective utilization of an internal space of the body housing are realized.

17 Claims, 10 Drawing Sheets

GAS TURBINE ENGINE

BACKGROUND OF THE INVENTION

1. Field of the Invention

The field of the present invention is gas turbine engines of the type in which the turbine rotor is driven for rotation by the combustion gas generated in the combustor, and more particularly, gas turbine engines of the type provided with a heat exchanger which utilizes the thermal energy of the combustion gas to heat air to be supplied to the combustor.

2. Description of the Prior Art

Generally, gas turbine engines are roughly grouped into a single shaft type in which one turbine shaft is commonly used for driving a compressor rotor and for producing an output, and a two-shaft type (a multi-shaft type) which is separately provided with a high pressure turbine shaft for driving the compressor rotor and a low pressure turbine shaft for producing the output. In either type of gas turbine engine, the layout of the heat exchanger thereof greatly influences the layout of the turbine shaft and the compactness of the casing, imparting a large restriction to the freedom of design of the gas turbine engine.

For example, in Japanese Patent Application Laid-Open No. 244121/89, there is disclosed a two-shaft type gas turbine engine having the high pressure turbine shaft and the low pressure turbine shaft disposed in series, wherein two heat exchangers are arranged parallel with the turbine shaft at a radial outer position of a turbine rotor to thereby avoid an interference between the turbine shaft and the heat exchangers.

Furthermore, Japanese Patent Application Laid-Open No. 4173/83 discloses a single shaft type gas turbine engine, wherein the heat exchanger is arranged axially externally of that end of the turbine shaft closer to the turbine rotor so as to be perpendicular to said turbine shaft, and the output is produced from the other end of the turbine shaft closer to the compressor rotor so as not to interfere with the heat exchanger.

In addition to the layouts of the aforementioned heat exchangers, the layout of a combustor for generating a combustion gas and of a collector housing for collecting the combustion gas which has driven the turbine rotor is important, and such layouts are important factors in achieving a compactness of the engine.

SUMMARY OF THE INVENTION

The present invention has been accomplished in view of the aforementioned circumstances. An object of the present invention is to reasonably lay out a heat exchanger, a turbine shaft, a combustor, a collector housing, etc. to thereby make dimensions of the gas turbine engine compact and to avoid the restriction imposed on the layout of the output shaft of the engine.

For achieving the aforesaid object, according to a first feature of the present invention, there is provided a gas turbine engine including a transmission system which comprises a turbine rotor for converting the fluid energy of a combustion gas into a rotational energy, a turbine shaft for supporting the turbine rotor, a speed change mechanism for converting a characteristic of the rotational energy of the turbine shaft and an output shaft for taking out the rotational energy converted by the speed change mechanism, and a heat exchanger for heating air supplied to a combustor by the combustion gas, wherein at least a part of the transmission system is disposed within a space formed so as to extend through the heat exchanger.

According to the above described arrangement, at least a part of the transmission system is arranged in a space formed by extending through the heat exchanger. Thereby, the output shaft of the transmission system can be directly mounted outside of the opposite side of the heat exchanger, and as a result, the freedom of the layout of the output shaft can be enhanced to make the engine compact.

According to a second feature of the present invention in addition to the aforementioned first feature of the present invention, the heat exchanger is formed in a disk-like shape which is rotatable about an axis, and the space is formed about the axis.

According to this second described arrangement, since the heat exchanger is of the rotary type, the heat exchange efficiency is enhanced. Also, since the space of the heat exchanger is formed about the rotational axis of the heat exchanger, the reduction in effective area of the heat exchanger by the presence of the space is minimized, and in addition, the interference between the inner surface of the space and the transmission system is prevented.

According to a third feature of the present invention in addition to the aforementioned first or second feature, the speed change mechanism of the transmission system is disposed in the space.

According to this third described arrangement, since the speed change mechanism of the transmission system is accommodated by utilizing the space formed in the heat exchanger, it is possible to save space and to make the engine compact.

According to a fourth feature of the present invention in addition to the aforementioned second feature, the output shaft of the transmission system is disposed coaxial with the axis of the heat exchanger.

According to this fourth described arrangement, since the output shaft of the transmission system is disposed in coaxial with the axis of the rotary type heat exchanger, in the case where the output shaft is connected to apparatus having a circular section, for example, such as a generator, a pump, etc., centering and installation therefor can be readily carried out.

According to a fifth feature in addition to the fourth feature of the present invention, an axis of the turbine shaft is made eccentric with respect to the axis of the heat exchanger.

According to this fifth arrangement, a reduction means having a simple construction comprised, for example, of a spur gear, can be interposed between the output shaft and the turbine shaft which are eccentric with each other.

According to a sixth feature of the present invention, there is provided a gas turbine engine comprising a combustor for generating a combustion gas, a turbine shaft having a turbine rotor which is driven by the combustion gas, a disk-like heat exchanger disposed so as to cross an axis of the turbine shaft, a collector housing for collecting the combustion gas which has driven the turbine rotor and for guiding the combustion gas to the heat exchanger, and a substantially cylindrical body housing having an outside diameter limited by an outside diameter of the heat exchanger, wherein the collector housing and the combustor are disposed on diametrically opposite sides in a transverse cross section of the body housing, and substantially the entire periphery of the body housing is of a double construction.

According to this sixth described arrangement, even if the body housing is formed into a compact cylindrical shape to receive therein the heat exchanger without a clearance, the internal space of the body housing is effectively utilized and an axial dimension of the engine is shortened since the collector housing and the combustor are disposed on the opposite sides in a diametrical direction in a transverse cross section of the body housing. In addition, since the outer periphery of the body housing which receives two high temperature members, i.e., said collector housing and said combustor, is of the double construction, heat radiation from the body housing to open air is suppressed due to the heat insulating effect thereof to improve the efficiency of the engine.

According to a seventh feature in addition to the sixth feature of the present invention, a double constructed portion of the body housing serves as a passage for compressed air.

According to this seventh described arrangement, since the double constructed portion of the body housing is utilized as a passage for compressed air, the internal space of the body housing is utilized more effectively, and the heat insulating effect is improved by the action of a layer of compressed air which is higher in temperature than open air.

According to an eighth feature in addition to the sixth or seventh feature of the present invention, the axis of the turbine shaft is made eccentric with respect to a central axis of the body housing, and the collector housing is disposed on the eccentric side.

According to this eighth described arrangement, the axis of the turbine shaft is made to be eccentric from the central axis of the body housing. Thereby, a position of the collector housing for collecting combustion gas used to drive the turbine shaft can be easily made to be eccentric toward one side in a cross section of the body housing. As a result, it is possible to sufficiently secure a space for arranging the combustor on the opposite side of the collector housing.

BRIEF DESCRIPTION OF THE DRAWINGS

FIGS. 1 to 7 show a first embodiment of the present invention, in which:

FIG. 1 is a longitudinal sectional view of a gas turbine engine;

FIG. 2 is a sectional view taken on line II—II of FIG. 1 showing a combustor and a high pressure turbine;

FIGS. 3 and 4 are sectional views taken on line III—III and line IV—IV, respectively, of FIG. 1 showing a collector housing;

FIG. 5 is a sectional view taken on line V—V of FIG. 1 showing a heat exchanger;

FIG. 6 is a sectional view taken on line VI—VI of FIG. 1 showing an exhaust housing; and FIG. 7 is a view showing a state of use of the gas turbine engine;

DESCRIPTION OF THE PREFERRED EMBODIMENTS

Embodiments of the present invention will be described hereinafter with reference to the drawings.

Figure 1:
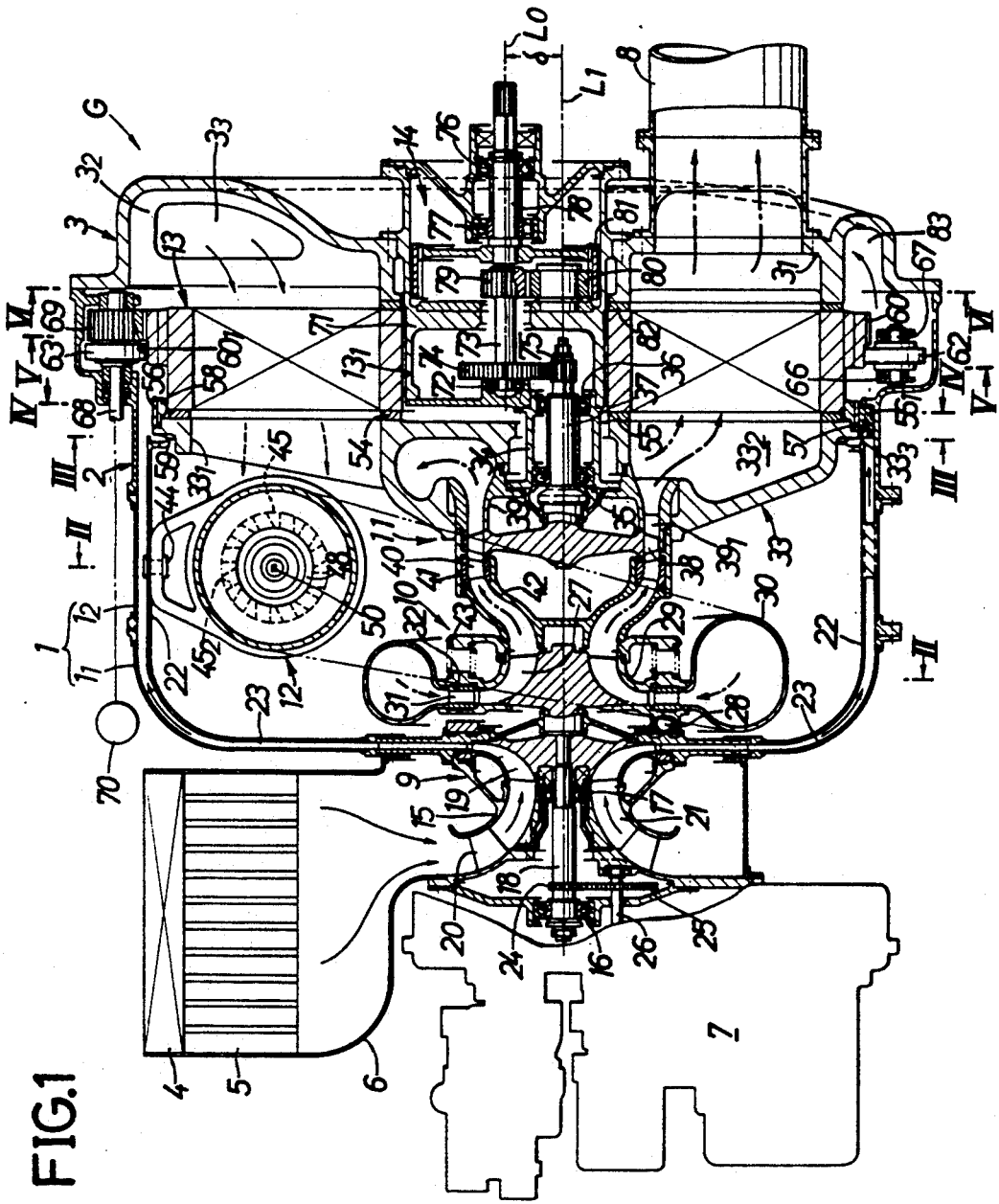

In a first embodiment, as shown in FIG. 1, a two-shaft type gas turbine engine G comprises a bottomed cylindrical body housing divided into two housings, i.e., a front body housing $1_1$ and a rear body housing $1_2$, an annular heat exchanger housing 2 connected to a rear opening of the body housing 1, and an exhaust housing 3 for covering a rear portion of the heat exchanger housing 2. A suction passage 6 provided with an air cleaner 4 and a silencer 5 and an auxiliary-device housing 7 for receiving auxiliary devices such as a generator, a stator, etc. are connected to a front portion of the body housing 1, and an exhaust duct 8 is connected to a rear portion of the exhaust housing 3.

A centrifugal compressor 9 for compressing air received from the suction passage 6 and a centrifugal high pressure turbine 10 for driving the compressor 9 are disposed before and behind a central opening formed in the body housing $1_1$; an axial-flow low pressure turbine 11 for producing an output is disposed at the rear of the high pressure turbine 10; and a combustor 12 for generating a combustion gas for driving the high pressure turbine 10 and the low pressure turbine 11 is disposed in an upper space of the body housing 1. A rotary type heat exchanger 13 for collecting heat energy of the combustion gas having passed through both the turbines 10 and 11 to heat suction air is disposed in an interior of the heat exchanger housing 2, and a reduction gear 14 for reducing the output of the low pressure turbine 11 to transmit the output outside is disposed in a center portion of the heat exchanger 13.

A high pressure turbine shaft 18 is rotatably supported through a ball bearing 16 and a roller bearing 17 in a central portion of a compressor casing 15 provided on the front body housing $1_1$, and a compressor rotor 19 formed at an outer periphery thereof with a number of blades is secured to the high pressure turbine shaft 18. Air received from the suction passage 6 is passed through a duct 21 having a stationary vane 20 and compressed by the compressor rotor 19, and the air is passed through an air passage 23 formed between the body housing 1 and an inner wall 22 and radially supplied to the rear of the body housing 1. An auxiliary output shaft 26 connected to the high pressure turbine shaft 18 through spur gears 24 and 25 is extended into an interior of the auxiliary-device housing 7 and is connected to auxiliary devices such as a generator, a starter, etc.

A high pressure turbine rotor 27 is formed at an outer periphery thereof with a number of blades and is secured to the rear end of the high pressure turbine shaft 18. The high pressure turbine rotor 27 is encased in a high pressure turbine shroud 29 made of ceramics which is supported on the inner surface of the front body housing $1_1$ through a roller 28. A spiral scroll 30 which is extended from the combustor 12 which will be described later is disposed externally of the high pressure turbine shroud 29, and a nozzle 32 provided with a number of variable stationary vanes 31 is provided between the inner periphery of the scroll 30 and the outer periphery of the high pressure turbine shroud 29.

A collector housing 33 which will be described later in detail is supported on the front end of the heat exchanger housing 2 connected to the rear portion of the body housing 1, and a low pressure turbine shaft 37 is supported on a bearing member 34 provided in the central portion of the collector housing 33 through a ball bearing 35 and a roller bearing 36. A low pressure turbine rotor 38 is secured to a tip end of the low pressure turbine shaft 37, and a number of blades formed at the outer periphery thereof are fitted in the inner surface of a low pressure turbine shroud 39 made of ceramics supported on the collector housing 33. An intermediate duct 42 made of ceramics and provided at a rear end thereof with a nozzle 41 having a variable stationary vane 40 is provided to connect between the low pressure turbine shroud 39 and the high pressure turbine shroud 28. A plurality of coil springs 43 are compressed between an annular bracket supported on the front end of the intermediate duct 42 and the high pressure turbine shroud 28.

The aforementioned high pressure turbine shaft 18 and low pressure turbine shaft 37 are coaxially disposed so as to extend on a common axis $L_1$ and the axis $L_1$ is located eccentric downwardly by a distance $\delta$ with respect to a center axis $L_o$ of the body housing 1 in which an output shaft 78 described later is disposed.

Figure 2:
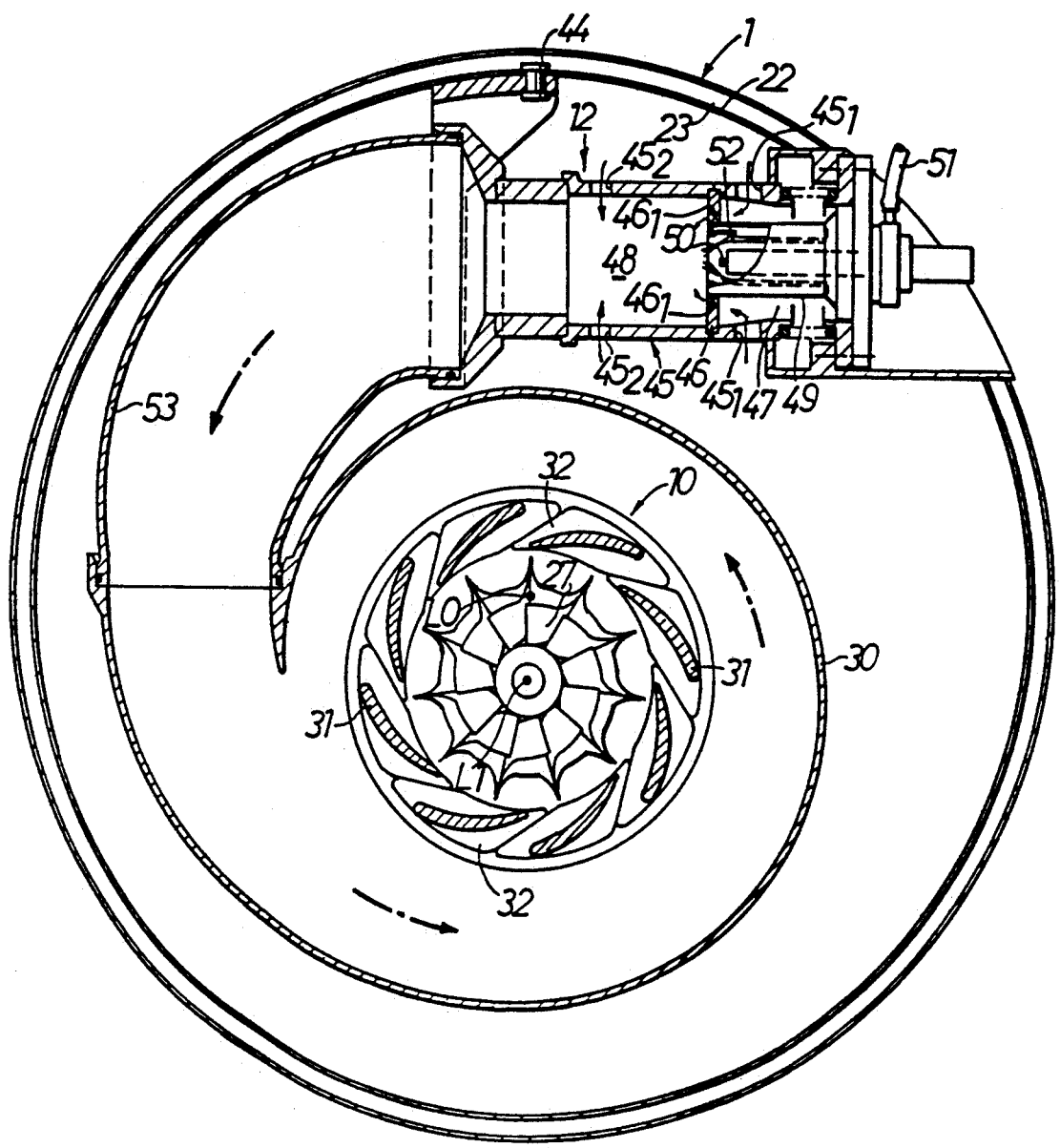

As is apparent by reference to FIG. 2 also, the combustor 12 supported to the inner wall 22 through a rivet 44 is disposed in an upper space of the body housing 1. The combustor 12 is provided with a cylindrical combustor housing 45, and an interior thereof is divided into a front chamber 47 and a main combustion chamber 48 by a diaphragm 46. An ignition plug 50 is provided in the center of an inner tube 49 supported in an interior of the front chamber 47, and a plurality of fuel nozzles 52 are disposed around the outer periphery of the ignition plug 50 to jet fuel supplied from a fuel pipe 51 into the main combustion chamber 48. A number of louvers $45_1$ and $45_2$ through which interior and exterior of front chamber 47 and the main combustion chamber 48 are communicated with each other are opened to the combustor housing 45, and a number of nozzle holes $46_1$ through which the front chamber 47 and the main combustion chamber 48 are communicated with each other are opened to the diaphragm 46. The main combustion chamber 48 is connected to the start end of the scroll 30 through a dilution zone 53 bent downwardly over approximately 90°. At this time, the center of the scroll 30, that is, the axis $L_1$ of the high pressure turbine shaft 18 and the low pressure turbine shaft 37 are made eccentric downwardly through a distance $\delta$ with respect to the center of the body housing 1 to thereby secure a space for receiving the combustor 12 in an upper space of the body housing 1.

Figure 3:
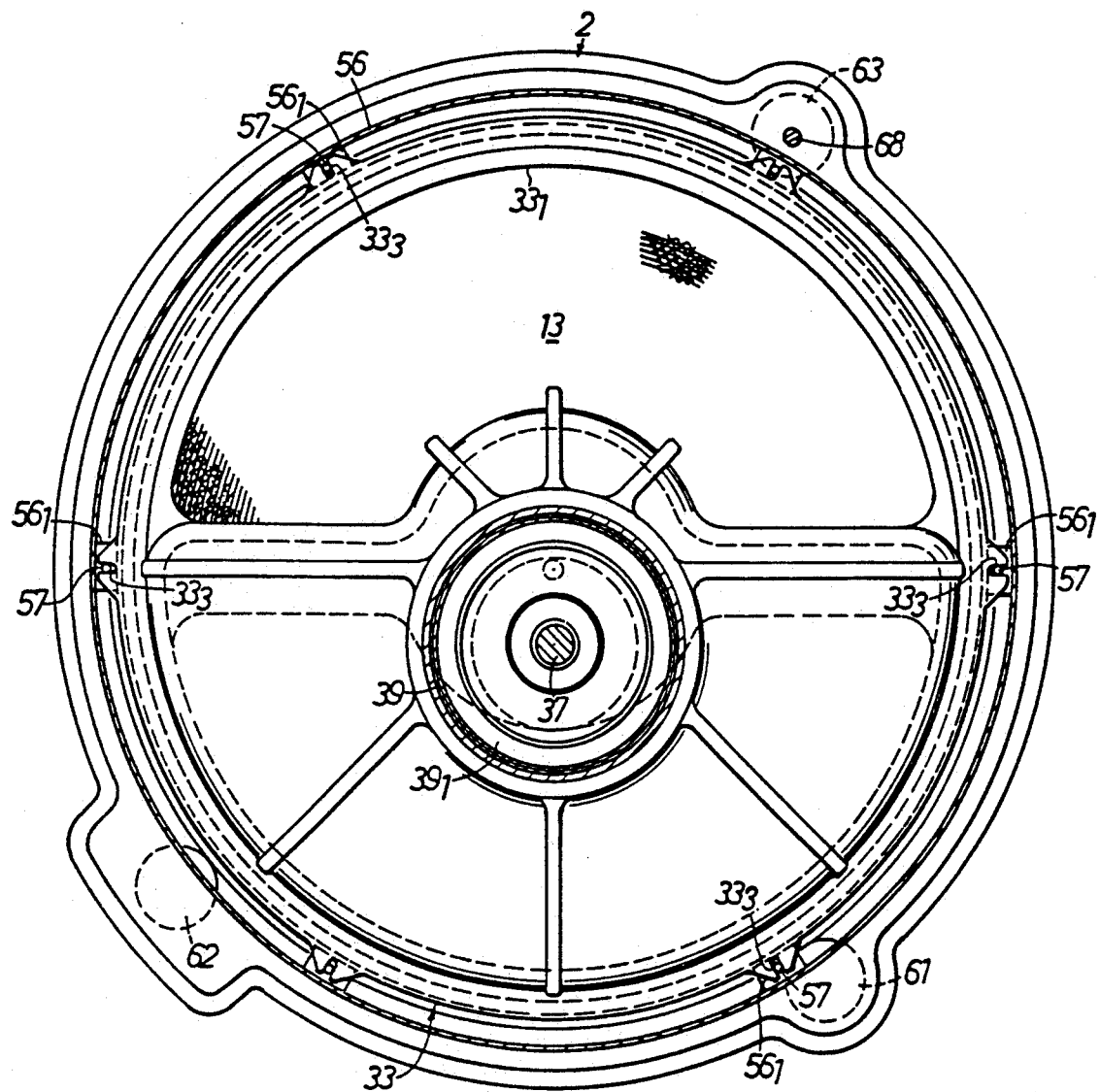
Figure 4:
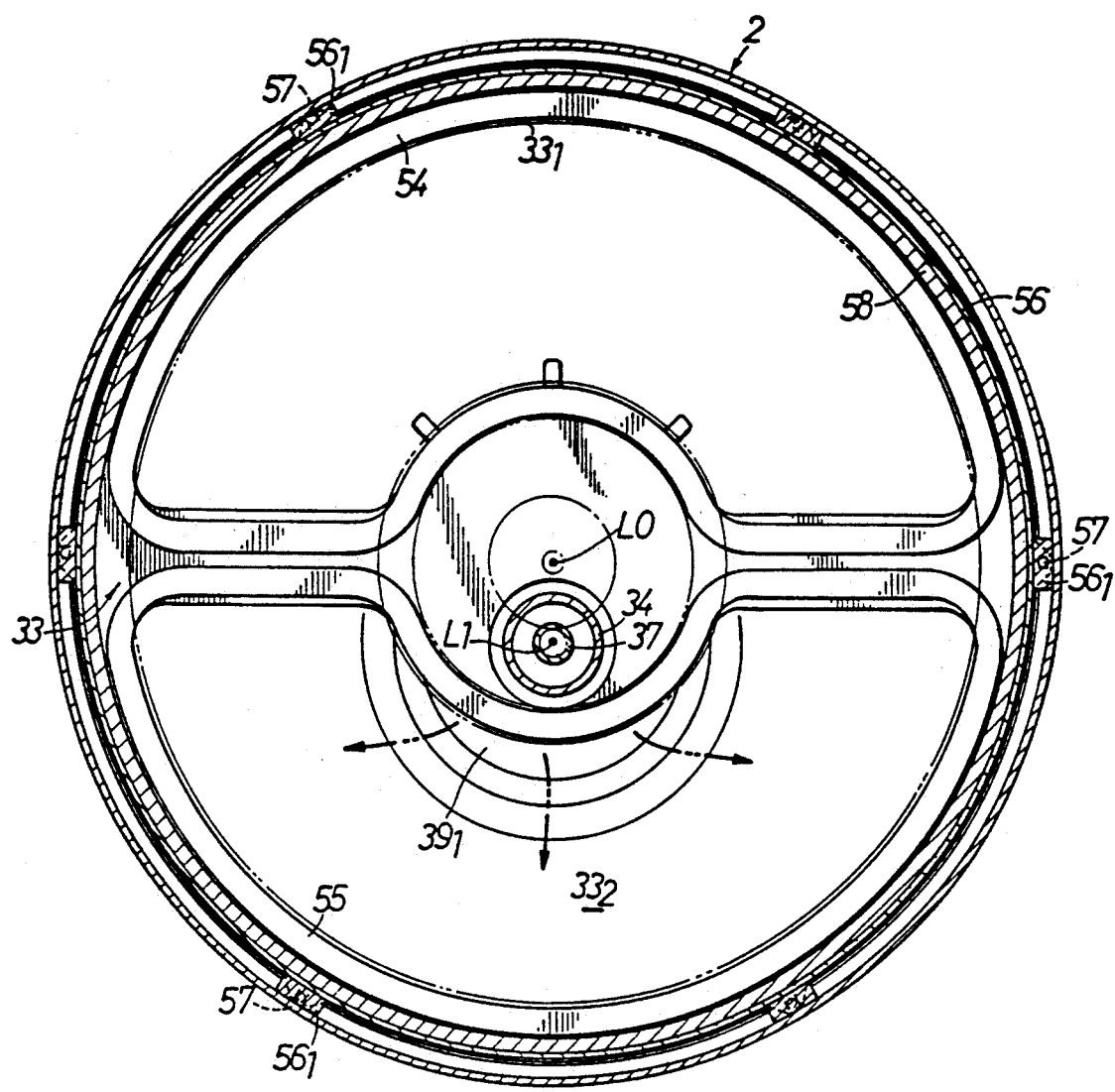

As shown in FIGS. 1, 3 and 4, the collector housing 33 is formed at its upper half portion with an arcuate opening $33_1$ extending over approximately 180° for guiding air heated by the heat exchanger 13 into the body housing 1, and a seal member 54 in sliding contact with a side surface of the heat exchanger 13 is supported around the periphery of the opening $33_1$. On the other hand, the collector housing 33 is formed at its lower half portion with an exhaust gas passage $33_2$ at which are collected exhaust gas having passed through an annular combustion gas passage $39_1$ formed in the low pressure turbine shroud 39, and a seal member 55 in sliding contact with the side of the heat exchanger 13 is supported around the periphery of an outlet end of the exhaust gas passage $33_2$. The lower half portion of the collector housing 33 surrounding the exhaust gas passage $33_2$ and the combustor 12 are disposed in the lower space and upper space, respectively, of the body housing 1 so as to avoid mutual interference.

An annular support ring 56 opposed to the rear end of the inner wall 22 of the body housing 1 is disposed in the inner periphery of the heat exchanger housing 2. A forwardly directed pin 57 is implanted in each of six brackets $56_1$ projected at circumferential intervals of 60° on the outer periphery of the support ring 56, and six slots $33_3$ radially formed on the outer periphery of the collector housing 33 are engaged with the pins 57. A seal member 58 in sliding contact with the outer periphery of the heat exchanger 13 is supported around the inner periphery of the support ring 56, and a diaphragm seal 59 is mounted between the outer periphery of the collector housing 33 and the rear end of the inner wall 22 of the body housing 1.

Figure 5:
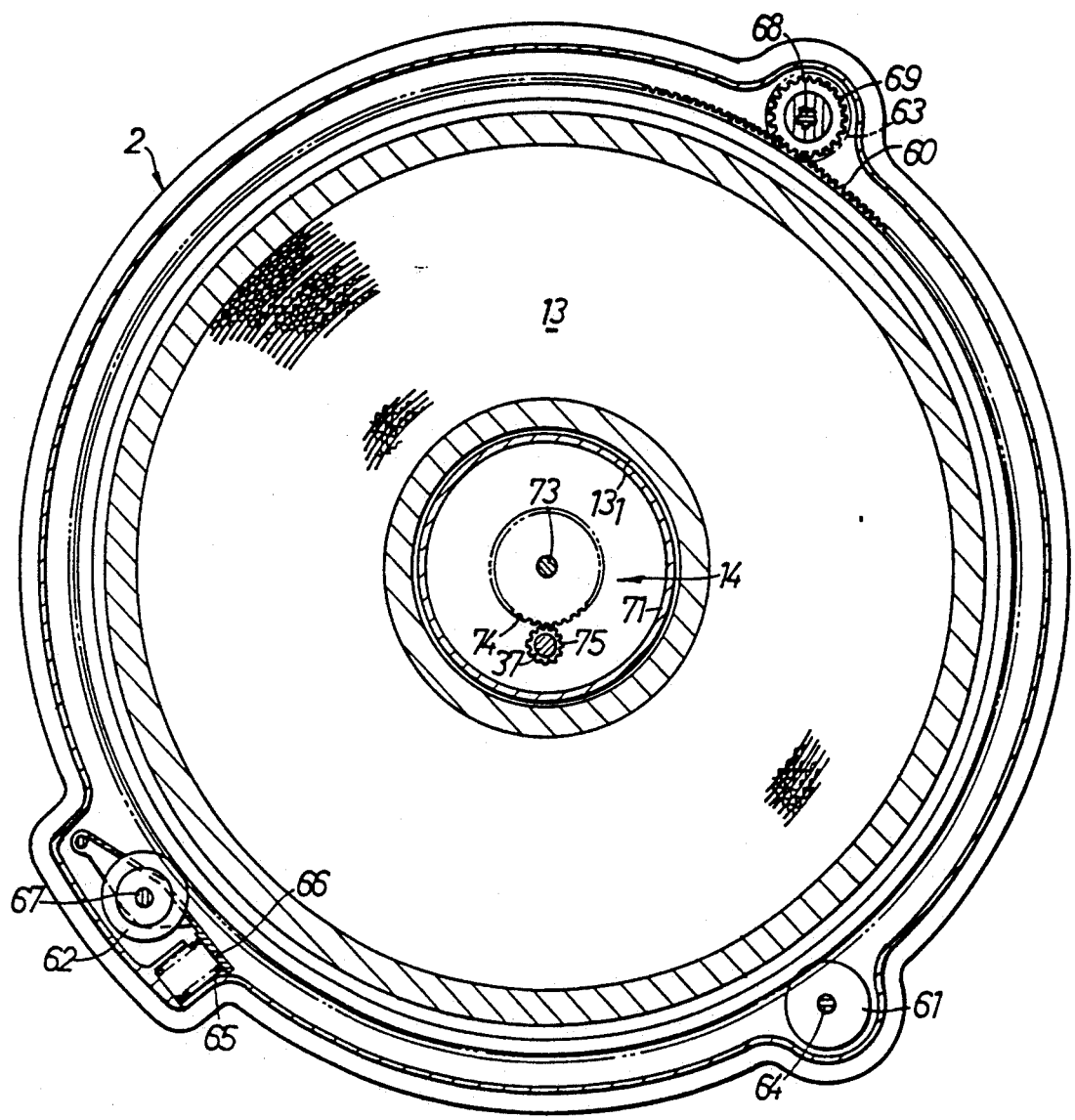

As is apparent from FIGS. 1 and 5, the heat exchanger 13 made of ceramics is formed in a disk-like shape having circular opening $13_1$ at a central portion thereof, and is accommodated in an interior of the heat exchanger housing 2 such that a core surface of the heat exchanger 13 through which suction air or exhaust gas passes is perpendicular to the axis $L_0$ of the body housing 1. A ring gear 60 is mounted over 360° around the outer periphery of the heat exchanger 13, and a flat support surface $60_1$ formed on the front portion of the ring gear 60 is rotatably supported by three guide rollers 61, 62 and 63 provided on the inner periphery of the heat exchange housing 2. The first guide roller 61 is simply supported on a rotational shaft 64 provided on the heat exchanger housing 2 but the second guide roller 62 is pivotably supported on the heat exchanger housing 2 and supported through a rotational shaft 67 on a bracket 66 having a U-shaped section biased by means of a spring 65. Thereby, the guide roller 62 is pressed against the support surface $60_1$ around the outer periphery of the heat exchanger 13 by means of a resilient force of the spring 65 in order to prevent a shaky movement of the heat exchanger 13. A pinion 69 meshed with the ring gear 60 is secured to a rotational shaft 68 which supports the third guide roller 63, and the rotational shaft 68 is rotated by a heat exchanger drive motor 70 to thereby drive the heat exchanger 13 for rotary operation.

The reduction gear 14 received into the opening $13_1$ extending through the central portion of the heat exchanger 13 is provided with a substantially cylindrical reduction gear box 71, and a large diameter spur gear 74 provided on an intermediate shaft 73 cantilever-supported by a ball bearing 72 within the box 71 is meshed with a small diameter spur gear 75 provided on the low pressure turbine shaft 37. An output shaft 78 supported by a ball bearing 76 and a roller bearing 77 along the center axis $L_0$ of the body housing 1 is connected to the intermediate shaft 73 by a planetary reduction mechanism comprising a sun gear 70, a planetary gear 80 and an internal gear or ring gear 81.

Figure 6:
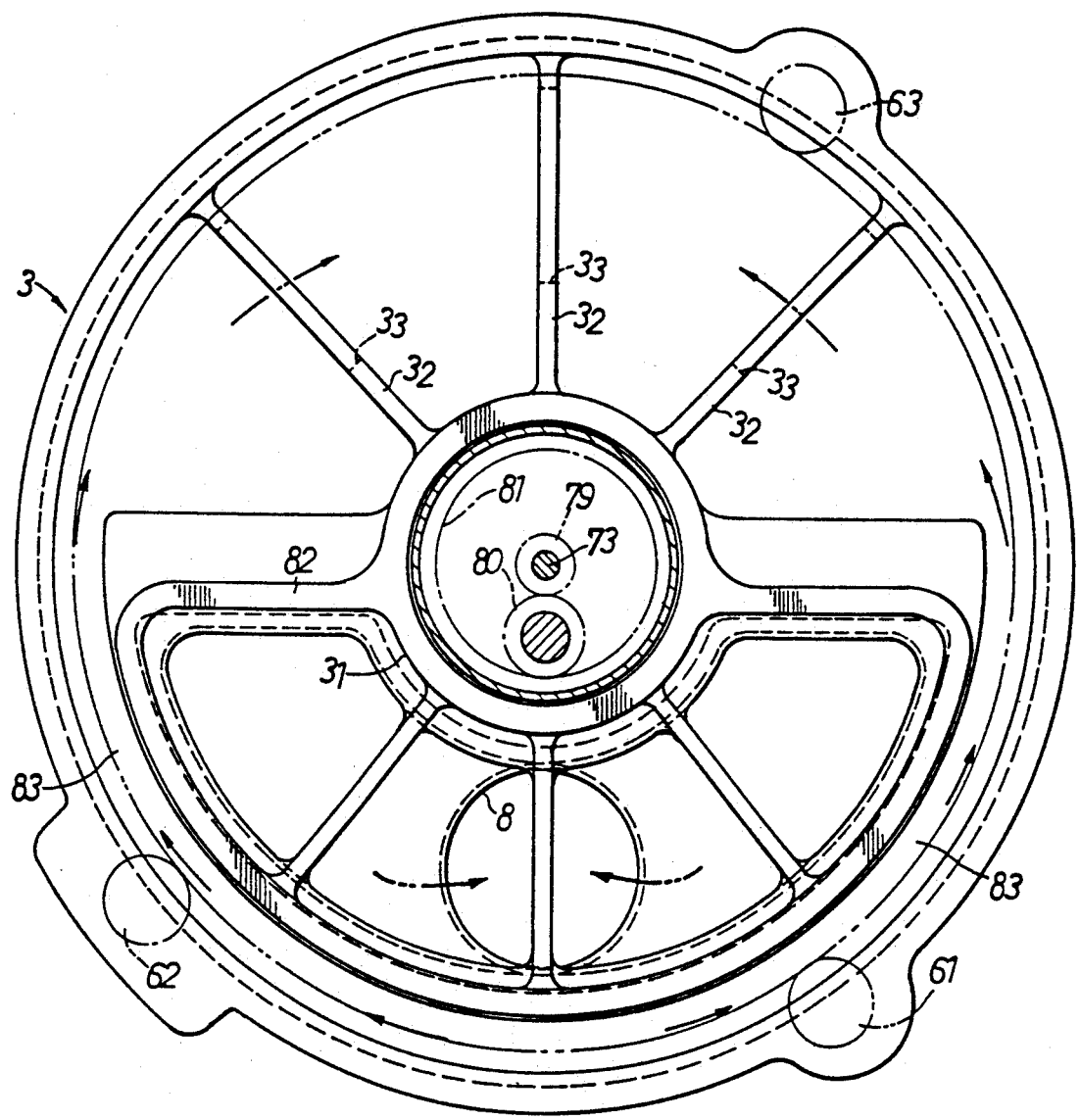

As is apparent from FIG. 6, the exhaust housing 3 connected to the rear portion of the heat exchanger housing 2 is formed at a lower portion of the housing 3 with a circular opening $3_1$ over approximately 180° for guiding the exhaust gas having passed through the heat exchanger 13 to the exhaust duct 8, and a seal member 82 in sliding contact with the side of the heat exchanger 13 is mounted around the periphery of the opening $3_1$. Air which passes through the lower half portion of the air passage 23 formed between the inner wall 22 and the body housing 1 and flows into the lower portion of the exhaust housing 3 reaches the upper space of the exhaust housing 3 through an air passage 83 formed around the outer periphery of the opening $3_1$. Air from the upper half portion of the air passage 23 is directly supplied to the upper space of the exhaust housing 3. Air which has reached the upper space of the exhaust housing 3 as described above is collected through openings $3_3$ formed in three diaphragms $3_2$ and thereafter supplied toward the heat exchanger 13.

Figure 7:
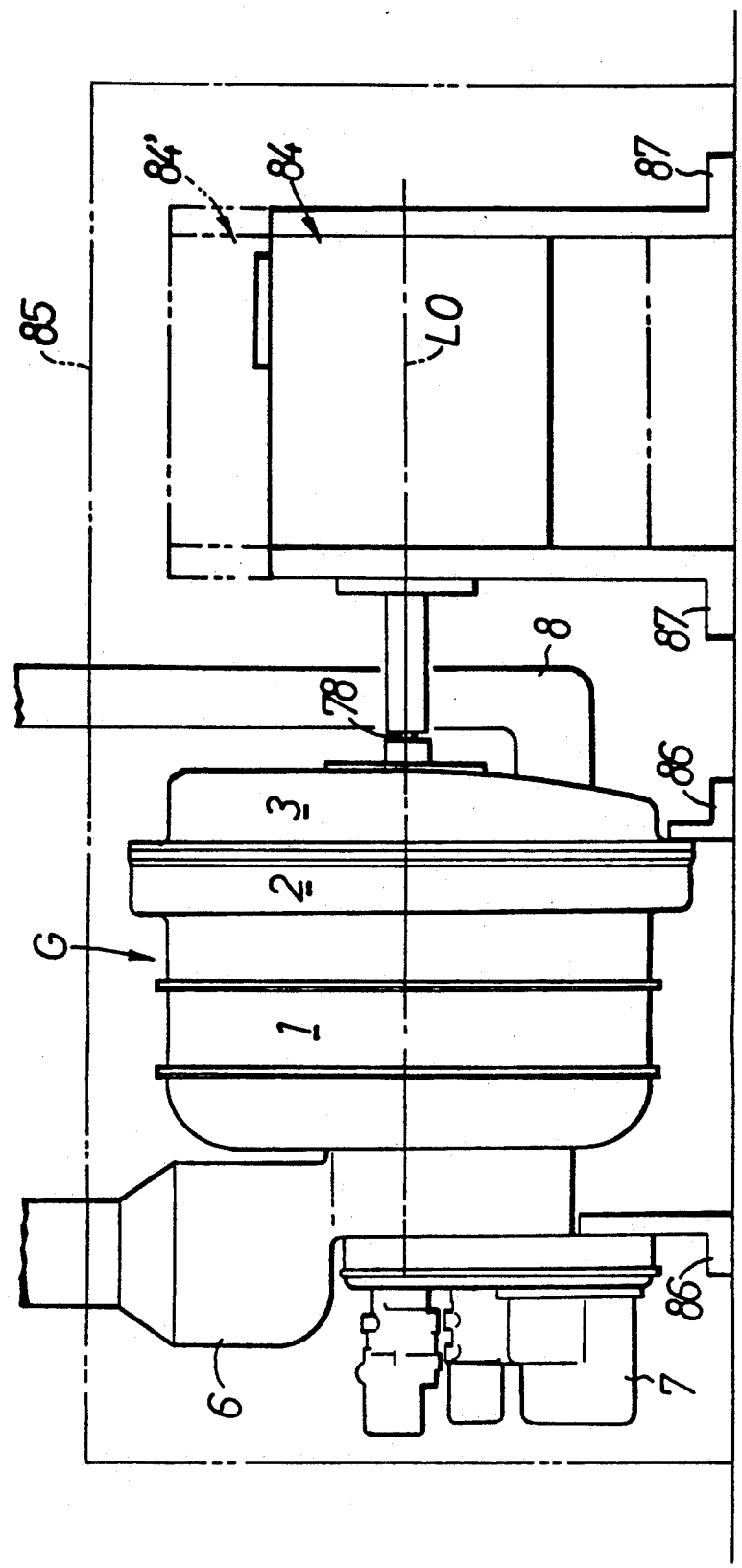

FIG. 7 shows the state in which the gas turbine engine G is applied to drive a generator 84. The substantially cylindrical generator 84 fixed in a horizontal state through a pair of mounting brackets 87 is connected to an output shaft 78 extended from the gas turbine engine G which is horizontally fixed in a box-like housing 85 through a pair of mounting brackets 86. In this case, since the output shaft 78 of the gas turbine engine G is aligned with the axis $L_0$ of the cylindrical body housing 1, the gas turbine engine G and the generator 84 are coaxially disposed along the axis $L_0$. As a result, a generator 84 having the substantially same diameter as that of the gas turbine engine can be encased in the housing 85 having a sectional shape in which the gas turbine engine G is encased without clearance, making it possible to effectively utilize the internal space of the housing 85.

Next, the operation of the first embodiment of the present invention provided with the aforementioned arrangement will be described.

Air having passed through the air cleaner 4 and the silencer 5 and flown into the suction passage 6 is compressed under a high pressure by the compressor rotor 19 when passing through the annular duct 21 formed in the compressor casing 15, and then the air is fed rearwardly through the radial air passage 23 formed between the body housing 1 and the inner wall 22. High pressure air which has reached the interior of the exhaust housing 3 from the air passage 23 is collected at the upper space of the exhaust housing 3, after which the air changes its direction forwardly and passes the upper half portion of the core surface of the rotary type heat exchanger 13 from the rear to the front. The air thus passed through the heat exchanger 13 and heated to a higher temperature flows into the internal space of the body housing 1 through the opening $3_1$ formed in the upper portion of the collector housing 33.

A part of air supplied to the internal space of the body housing 1 flows into the front chamber 47 through a number of louvers $45_1$ formed in the housing 45 of the combustor 12, and then the air flow is turned to a spiral current by passing through the nozzle hole $46_1$ formed in the diaphragm 46, and the air is supplied to the main combustion chamber 48. At this time, fuel jetted out of a number of fuel nozzles 52 which are disposed internally of the inner tube 49 is atomized by the spiral current and mixed with air supplied from a number of louvers $45_2$ formed around the outer periphery of the main combustion chamber 48 and burned. The combustion gas generated in the main combustion chamber 48 is supplied to the annular scroll 30 through the dilution zone 53, and from the scroll 30 the combustion gas is sprayed against the high pressure turbine rotor 27 through a number of nozzles 32. When the high pressure turbine rotor 27 is then rotated, the compressor rotor 19 provided on the high pressure turbine shaft 18 is driven, and a part of the power thereof is used to drive auxiliary devices through the auxiliary output shaft 26. It is to be noted that the auxiliary output shaft 26 is used as an input shaft when the high pressure turbine shaft 18 is rotated by a starter from the outside for starting the engine. When the high pressure turbine shroud 29 made of ceramics is thermally expanded radially by heat of the high temperature combustion gas, the aforesaid thermal expansion is absorbed by rotation of the roller 28 interposed between the shroud 29 and the front body housing $1_1$.

The combustion gas having passed through the high pressure turbine rotor 27 passes through the nozzle 41 provided at the rear end of the intermediate duct 42 to be sprayed against the low pressure turbine rotor 38 to drive and rotate the low pressure turbine shaft 37. The rotation of the low pressure turbine shaft 37 is transmitted to the intermediate shaft 73 through the spur gears 74 and 75 which are used for deceleration and is further transmitted to the output shaft 78 through the planetary reduction mechanism comprising the sun gear 79, the planetary gear 80 and the internal gear 81. An axial displacement of the high pressure turbine shroud 29 made of ceramics, the intermediate duct 42 and the low pressure turbine shroud 39 due to the thermal expansion is absorbed by the resilient force of the coil spring 43 compressed between the high pressure turbine shroud 29 and the intermediate duct 42.

The exhaust gas which has driven the low pressure turbine rotor 38 is collected by the exhaust gas passage $33_2$ formed at the lower portion of the collector housing 33, after which the exhaust gas passes through the lower half portion of the core surface of the rotary type heat exchanger 13 from the front to the rear to heat the heat exchanger 13 and is then discharged to the exhaust duct 8. The heat exchanger 13 thus heated by the exhaust gas is rotated by the heat exchanger drive motor 70 through the pinion 69 and the ring gear 60, and the heated core surface is successively opposed to the passage of suction air. At that time, both front and rear surfaces and outer peripheral surface of the heat exchanger 13 are sealed by the seal members 54, 55, 82 and 58.

When the gas turbine engine G is operated as described above, the interior of the body housing 1 is maintained at a high temperature by the passage of air having passed through the heat exchanger 13 and of combustion gas generated in the combustor 12. At that time, if the excess heat is released to the low temperature open air through the wall surface of the body housing 1, performances such as fuel consumption, output, etc. of the gas turbine engine G are possibly impaired. However, since air corn-pressed by the compressor 9 and heated to an intermediate temperature between the internal temperature of the body housing 1 and the outside temperature passes in a layer through the air passage 23 formed between the inner wall 22 the body housing 1, radiation from the body housing 1 can be suppressed by the air layer.

The heat exchanger 13 is disposed to be perpendicular to the axis $L_1$ of the high pressure turbine shaft 18 and the low pressure turbine shaft 37, whereby the dimension of the outside diameter of the gas turbine engine G is made compact. In addition, the reduction gear 14 is disposed within the space formed in the center of the heat exchanger 13, thereby preventing the axial dimension of the gas turbine engine G from being increased.

Figure 8:
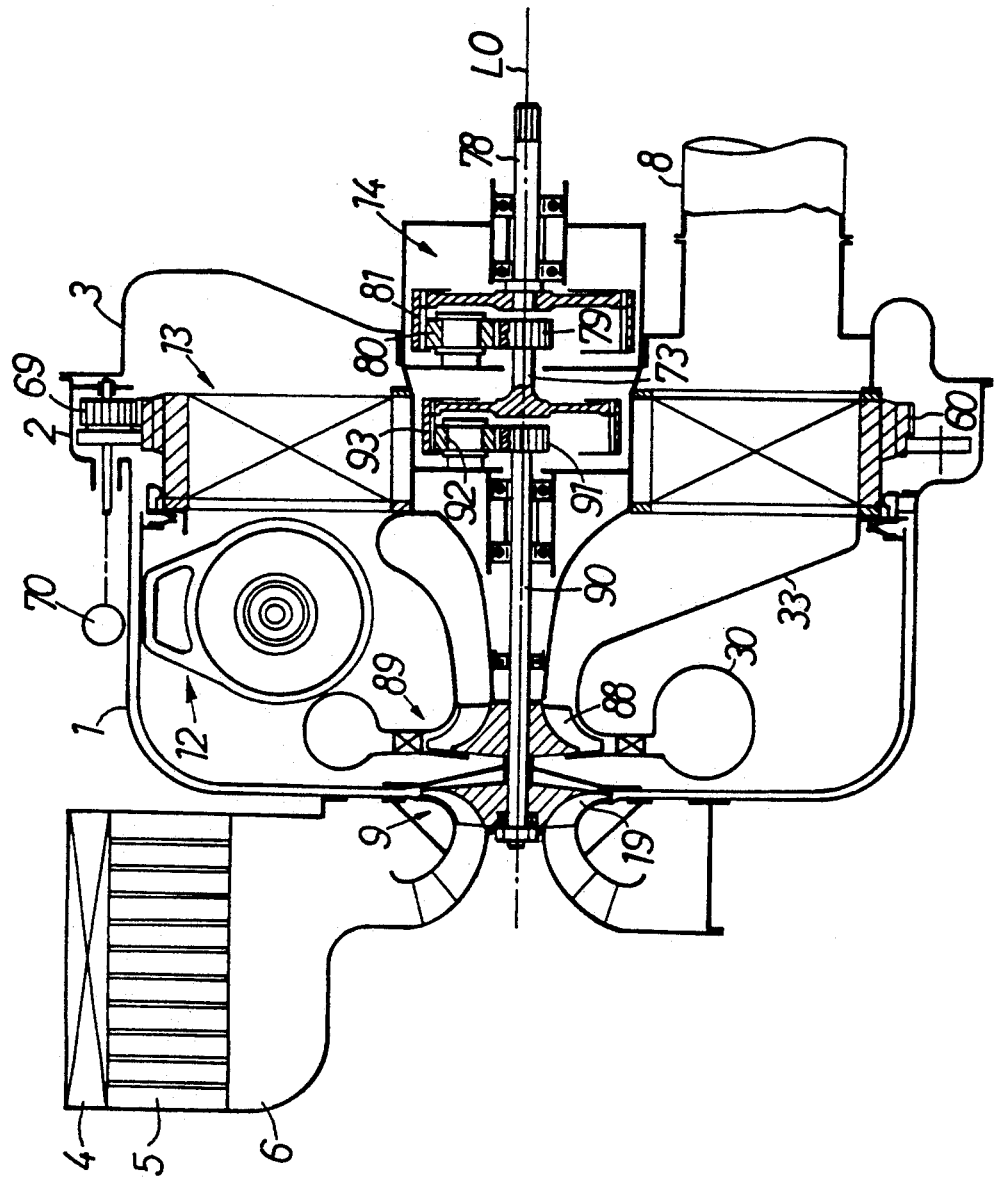
FIG. 8 is a longitudinal sectional view of a gas turbine engine according to a second embodiment of the present invention.

FIG. 8 shows a second embodiment of the present invention, in which embodiment, members corresponding to those shown in FIG. 1 are indicated by the same reference numerals.

This gas turbine engine G is of a single shaft type, in which a centrifugal compressor 9 provided with a compressor rotor 19 and a centrifugal turbine 89 provided with a turbine rotor 88 are supported on a common turbine shaft 90 disposed along the rotational axis of the heat exchanger 13, that is, the center axis $L_0$ of the body housing 1. An intermediate shaft 73 is disposed coaxial with the axis $L_0$ in the central portion of the reduction gear 14, a first planetary reduction mechanism comprising a sun gear 91, a planetary gear 92 and an internal gear 93 is disposed between the intermediate shaft 73 and the turbine shaft 90 such that the first planetary reduction mechanism is accommodated in a space formed in a center of the heat exchanger 13. And a second planetary reduction mechanism comprising a sun gear 79, a planetary gear 80 and an internal gear 81 which are the same as those of the previous embodiment is arranged between the intermediate shaft 73 and the output shaft 78.

According to this embodiment, when the combustion gas generated in the combustor 12 is supplied to the turbine rotor 88 through the scroll 30 to drive the turbine shaft 90, the output of the turbine shaft 90 is reduced in speed at a large reduction ratio by the aforesaid two planetary reduction mechanisms and taken by the output shaft 78, and at the same time, the compressor 9 is directly driven by a part of the rotational energy of the turbine shaft 90. Since the reduction gear 14 is disposed in the space formed at the center of the heat exchanger 13, the axial dimension of the gas turbine engine G can be reduced and further, the gas turbine engine G can be made more compact also due to the characteristic of the single type which has no turbine exclusively used for driving the compressor 9.

Figure 9:
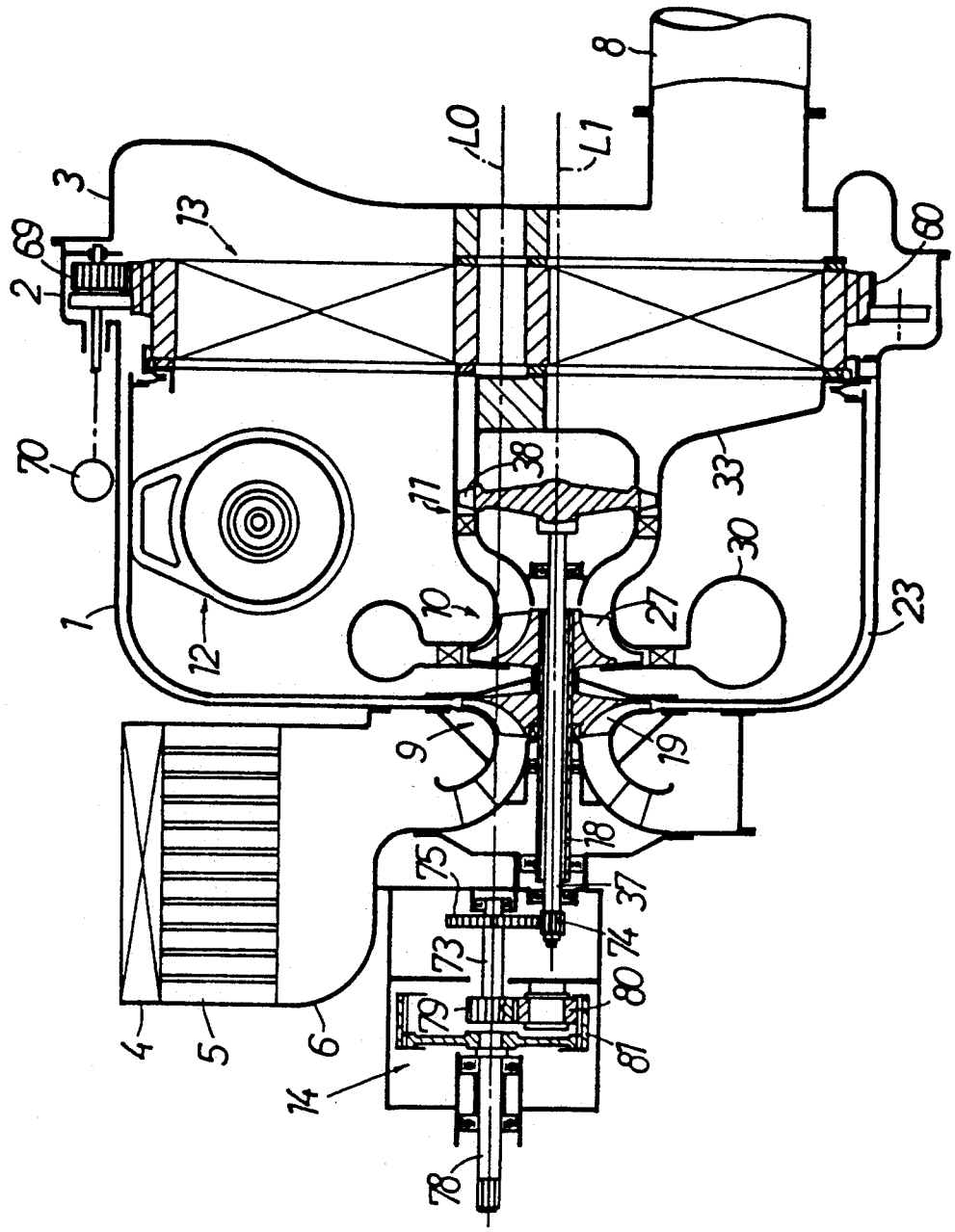
FIG. 9 is a longitudinal sectional view of a gas turbine engine according to a third embodiment of the present invention.

FIG. 9 shows a third embodiment, in which members corresponding to those shown in FIG. 1 are indicated by the same reference numerals.

In this embodiment, a high pressure turbine shaft 18 supporting a compressor rotor 19 and a high pressure turbine rotor 27 is formed to be hollow, and a low pressure turbine shaft 37 supporting a low pressure turbine rotor 38 is coaxially supported in an interior of the high pressure turbine shaft 18. The rotation of the low pressure turbine shaft 37 extended into the reduction gear 14 provided forwardly of the body housing 1 is transmitted to an intermediate shaft 73 disposed coaxial with the central axis $L_0$ of the body housing 1 through a pair of spur gears 74 and 75 and further transmitted to an output shaft 78 through a planetary reduction mechanism comprising a sun gear 79, a planetary gear 80 and an internal gear 81.

The same operation and effect as those of the first embodiment can be obtained by this embodiment. Moreover, since the output shaft 78 can be disposed in the direction opposite to the heat exchanger 13, an area of the core surface of the heat exchanger 13 is sufficiently secured to improve the heat exchange efficiency.

Figure 10:
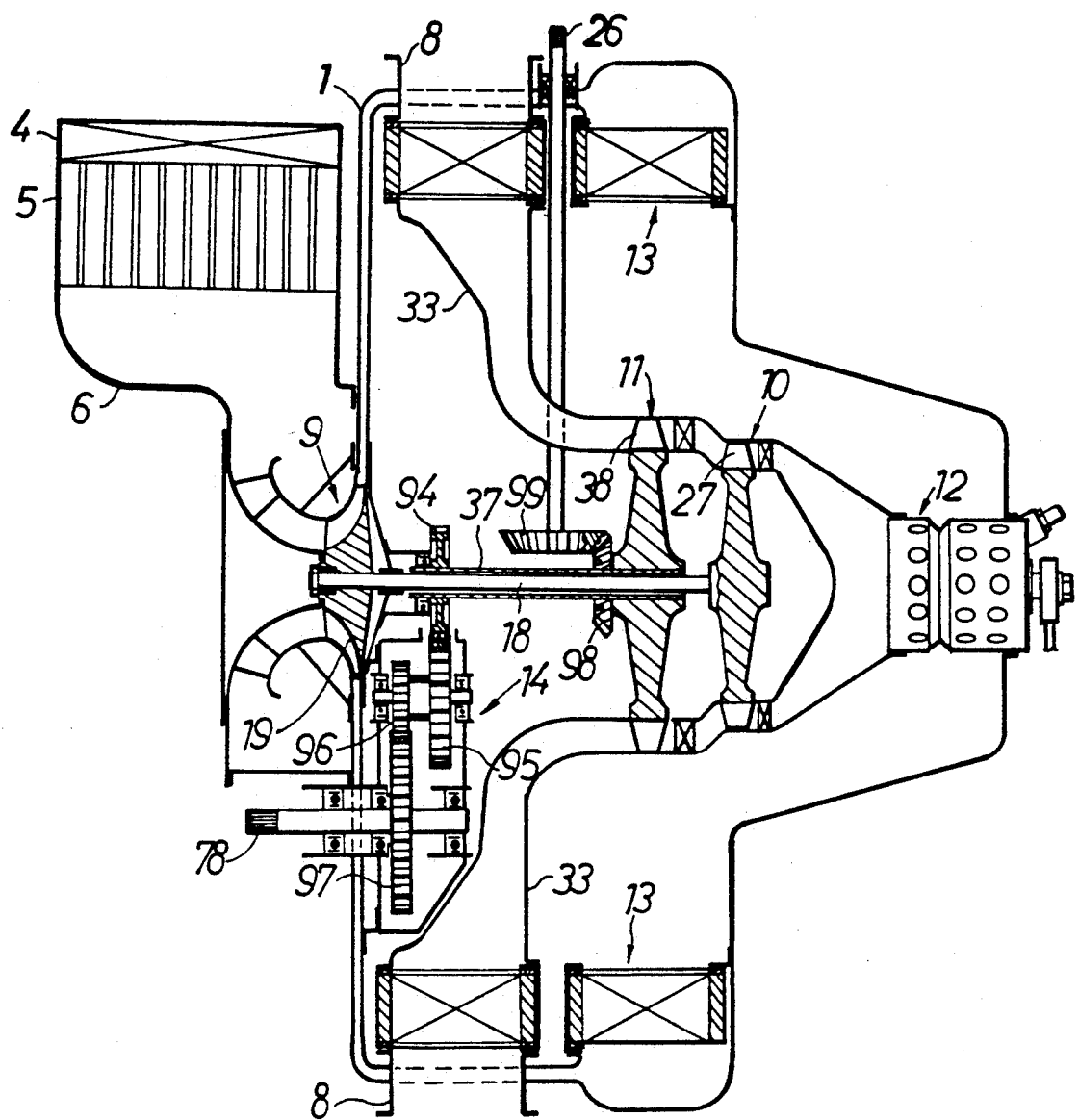
FIG. 10 is a longitudinal sectional view of a gas turbine engine according to a fourth embodiment of the present invention.

FIG. 10 shows a fourth embodiment, in which members corresponding to those shown in FIG. 1 are indicated by the same reference numerals.

In this embodiment, the combustor 12 is provided at the rear end of the body housing 1, and the high pressure turbine 10 and the low pressure turbine 11 driven by the combustor 12 are of the axial flow type. The hollow low pressure turbine shaft 37 supporting the low pressure turbine rotor 38 is coaxially disposed around the outer periphery of the high pressure turbine shaft 18 supporting the high pressure turbine rotor 27 and the compressor rotor 19. The rotation of the low pressure turbine shaft 37 is reduced in speed by four spur gears 94, 95, 96 and 97 of the reduction gear 14 and transmitted to the output shaft 78 projected forwardly of the body casing 1.

A pair of heat exchangers 13 connected to a drive source (not shown) for rotation is disposed in an interior of the body casing 1. These heat exchangers 13 are rotatably disposed about an axis which is extended radially and perpendicular to the low pressure turbine shaft 37, and the combustion gas which has driven the low pressure turbine 11 passes the front portions of the heat exchangers 13 and air compressed by the compressor 9 passes the rear portions thereof. An auxiliary output shaft 26 connected to the low pressure turbine shaft 37 through a pair of bevel gears 98 and 99 is extended through the center of one heat exchanger 13 radially and externally and is extended outside the body casing 1. In this embodiment, the output shaft 75 can be replaced by the auxiliary output shaft 26 and the output shaft and the auxiliary shaft can be disposed radially and axially, respectively.

According to this embodiment, the freedom in the layout of the heat exchangers 13 and the freedom in setting the direction of mounting the output shaft 78 and the auxiliary output shaft 26 are further increased and the general-purpose properties of the gas turbine engine G can be enhanced.

The embodiments of the present invention have been described in detail. However, the present invention is not limited to the above described embodiments but various minor changes in design can be made without departing from the present invention defined in claims. For example, the present invention is not limited to the gas turbine engine of the single shaft type or the two-shaft type but can be also applied to a known three-shaft type gas turbine engine in which, in addition to a high pressure turbine shaft and a low pressure turbine shaft, a third shaft is disposed. Furthermore, while the heat exchangers in the above described embodiments are of the rotary type, it is to be noted that fixed type heat exchangers can be employed.

What is claimed is:

1. A gas turbine engine including a transmission system which comprises a turbine rotor for converting a fluid energy of a combustion gas into a rotational energy; a turbine shaft for supporting said turbine rotor; a speed change mechanism for converting the rotational energy of said turbine shaft; an output shaft for producing rotational energy converted by said speed change mechanism; a heat exchanger; a combustor; a housing surrounding and supporting said turbine shaft, said output shaft, said speed change mechanism, said heat exchanger and said combustor; said housing having a wall forming an internal chamber; an air inlet at one end of said housing and said heat exchanger at another end of said housing with said internal chamber located between said ends; said combustor connected to a spiral scroll positioned in said internal chamber and extending circumferentially around and connected to said turbine rotor for supplying said combustion gas to said turbine rotor; said combustor and said spiral across causing heating of said internal chamber for heating the air flowing from the heat exchanger through said internal chamber to said combustor; and said heat exchanger being heated by the combustion gas discharged from said turbine rotor for heating inlet air flowing therethrough.

2. The gas turbine engine according to claim 1, wherein said heat exchanger is formed in a disk-like shape and rotated about an axis, and including means for causing inlet air to flow through one portion of said heat changer and combustion gas to flow through another portion of said heat exchanger, which portions change as the heat exchanger rotates.

3. The gas turbine engine according to claim 2, wherein said output shaft of said transmission system is disposed coaxial with the axis of said heat exchanger.

4. The gas turbine engine according to claim 2, wherein an axis of said turbine shaft is made eccentric with respect to the axis of said heat exchanger.

5. The gas turbine engine according to claim 3, wherein an axis of said turbine shaft is made eccentric with respect to the axis of said heat exchanger.

6. A gas turbine engine including a transmission system which comprises a turbine rotor for converting a fluid energy of a combustion gas into a rotational energy, a turbine shaft for supporting said turbine rotor, a speed change mechanism for converting a characteristic of the rotational energy of said turbine shaft and having an output shaft for producing rotational energy converting by said speed change mechanism, a heat exchanger, at least a part of said transmission system being disposed within a space formed so as to extend through said heat exchanger, a combustor, a housing surrounding and supporting said turbine shaft, said output shaft, said speed change mechanism, said heat exchanger and said combustor, said housing having a double wall forming an annular air passage, an interior wall of said double wall forming an internal chamber, said annular air passage extending from an air inlet at one end of said housing to another end of said housing to supply air to and through said heat exchanger at said another end and into said internal chamber, said combustor connected to a spiral scroll positioned in said internal chamber and extending circumferentially around and connected to said turbine rotor for supplying said combustion gas to said turbine rotor, said combustor and said spiral scroll causing heating of said internal chamber and said interior wall for preheating air flowing n said annular air passage from said air inlet to said heat exchanger and heating the air flowing from the heat exchanger through said internal chamber to said combustor, and said heat exchanger being heated by the combustion gas discharged from said turbine rotor for heating inlet air flowing therethrough.

7. The gas turbine engine according to claim 6, wherein said heat exchanger is formed in a disk-like shape which is rotatable about an axis.

8. The gas turbine engine according to claim 6 or 7, wherein said speed change mechanism of said transmission system is disposed within said heat exchanger.

9. The gas turbine engine according to claim 7, wherein said output shaft of said transmission system is disposed coaxial with the axis of said heat exchanger.

10. The gas turbine engine according to claim 8, wherein said output shaft of said transmission system is disposed coaxial with the axis of said heat exchanger.

11. The gas turbine engine according to claim 9, wherein an axis of said turbine shaft is made eccentric with respect to the axis of said heat exchanger.

12. The gas turbine engine according to claim 10, wherein an axis of said turbine shaft is made eccentric with respect to the axis of said heat exchanger.

13. A gas turbine engine including a transmission system which comprises a turbine rotor for converting a fluid energy of a combustion gas into a rotational energy; a turbine shaft for supporting said turbine rotor; a speed change mechanism for converting the rotational energy of said turbine shaft; an output shaft for producing rotational energy converted by said speed change mechanism; a heat exchanger, a combustor; a housing surrounding and supporting said turbine shaft, said output shaft, said speed change mechanism, said heat exchanger and said combustor; said housing having a double wall forming an annular air passage, an interior wall of said double wall forming an internal chamber; said annular air passage extending from an air inlet at one end of said housing to another end of said housing to supply air to and through said heat exchanger at said another end and into said internal chamber; said combustor connected to a spiral scroll positioned in said internal chamber and extending circumferentially around and connected to said turbine rotor for supplying said combustion gas to said turbine rotor; said combustor and said spiral scroll causing heating of said interior wall and said internal chamber for preheating air flowing in said annular air passage from said air inlet to said heat exchanger and heating the air flowing from the heat exchanger through said internal chamber to said combustor; and said heat exchanger being heated by the combustion gas discharged from said turbine rotor for heating inlet air flowing therethrough.

14. The gas turbine engine according to claim 13, wherein said heat exchanger is formed in a disk-like shape and rotated about an axis, and including means for causing inlet air to flow through one portion of said heat exchanger and combustion gas to flow through another portion of said heat exchanger, which portions change as the heat exchanger rotates.

15. The gas turbine engine according to claim 14, wherein said output shaft of said transmission system is disposed coaxial with the axis of said heat exchanger.

16. The gas turbine engine according to claim 14, wherein an axis of said turbine shaft is made eccentric with respect to the axis of said heat exchanger.

17. The gas turbine engine according to claim 15, wherein an axis of said turbine shaft is made eccentric with respect to the axis of said heat exchanger.

* * * * *

UNITED STATES PATENT AND TRADEMARK OFFICE
CERTIFICATE OF CORRECTION

PATENT NO. : 5,274,997
DATED : January 4, 1994
INVENTOR(S) : Inoue et al.

It is certified that error appears in the above-indentified patent and that said Letters Patent is hereby corrected as shown below:

Column 10, claim 1, line 64, delete "across" and insert -- scroll --.

Column 11, claim 2, line 7, delete "change" and insert -- exchanger ---.

Signed and Sealed this

Eighteenth Day of October, 1994

Attest:

BRUCE LEHMAN

*Attesting Officer*      *Commissioner of Patents and Trademarks*